(12) United States Patent
Ökvist et al.

(10) Patent No.: US 11,489,958 B2
(45) Date of Patent: Nov. 1, 2022

(54) USER EQUIPMENT, METHOD BY A USER EQUIPMENT, AND NETWORK NODE FOR GENERATING A GRIP PATTERN NOTIFICATION THROUGH A USER INTERFACE BASED ON RADIO CHARACTERISTICS

(71) Applicant: Telefonaktiebolaget LM Ericsson (publ), Stockholm (SE)

(72) Inventors: Peter Ökvist, Luleå (SE); Tommy Arngren, Södra Sunderbyn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 135 days.

(21) Appl. No.: 17/049,183

(22) PCT Filed: May 2, 2018

(86) PCT No.: PCT/EP2018/061106
§ 371 (c)(1),
(2) Date: Oct. 20, 2020

(87) PCT Pub. No.: WO2019/210938
PCT Pub. Date: Nov. 7, 2019

(65) Prior Publication Data
US 2021/0243293 A1 Aug. 5, 2021

(51) Int. Cl.
*H04M 1/72454* (2021.01)
*H04B 7/0413* (2017.01)
(Continued)

(52) U.S. Cl.
CPC ...... *H04M 1/72454* (2021.01); *H04B 7/0413* (2013.01); *H04W 24/02* (2013.01); *H04W 24/08* (2013.01); *G06F 1/1643* (2013.01); *G06F 3/016* (2013.01); *G06F 3/018* (2013.01); *G06F 2200/1637* (2013.01); *H04W 68/00* (2013.01)

(58) Field of Classification Search
CPC ... H01Q 1/243; H01Q 1/245; H04M 2250/12; H04M 1/00; H04M 1/02; H04M 1/247; H04M 1/2471; H04M 1/2473; H04M 1/2474; H04M 1/2477; H04M 1/2478;
(Continued)

(56) References Cited

U.S. PATENT DOCUMENTS 8,442,600 B1 * 5/2013 Tseng .................. H04M 1/0268
455/566
8,897,778 B2 * 11/2014 Ghosal .............. H04W 36/0055
455/437
(Continued)

OTHER PUBLICATIONS

International Search Report and Written Opinion of the International Searching Authority for PCT International Application No. PCT/EP2018/061106 dated Dec. 10, 2018.

*Primary Examiner* — Dung B Huynh
(74) *Attorney, Agent, or Firm* — Sage Patent Group (57) ABSTRACT

A user equipment obtains a radio characteristics measurement for at least one of a plurality of antennas of the user equipment. Responsive to the radio characteristics measurement satisfying a grip pattern reconfiguration rule, the user equipment selects a grip pattern from among a set of grip patterns, and generates a grip pattern notification through a user interface based on the grip pattern that was selected.

14 Claims, 6 Drawing Sheets

(51) Int. Cl.
*H04W 24/08* (2009.01)
*H04W 24/02* (2009.01)
*G06F 3/01* (2006.01)
*H04W 68/00* (2009.01)
*G06F 1/16* (2006.01)

(58) Field of Classification Search
CPC ... H04W 52/288; H04W 52/38; H04W 24/08; H04B 1/40; H04B 7/0413
See application file for complete search history.

(56) References Cited

U.S. PATENT DOCUMENTS

| | | | |
|---|---|---|---|
| 9,143,178 B1* | 9/2015 | Arscott | H04B 1/38 |
| 9,143,681 B1* | 9/2015 | Ebsen | H04N 5/23222 |
| 9,282,127 B1* | 3/2016 | Burns | H04N 7/147 |
| 9,692,875 B2* | 6/2017 | Novet | H04M 1/72454 |
| 10,484,033 B1* | 11/2019 | Li | H04B 1/3838 |
| 10,834,555 B2* | 11/2020 | Matthews | H04W 8/20 |
| 10,911,427 B1* | 2/2021 | Murakami | H04L 63/08 |
| 11,172,060 B1* | 11/2021 | Farzami | H04M 1/0202 |
| 11,206,909 B2* | 12/2021 | Chodieva | A45D 40/24 |
| 2005/0179602 A1* | 8/2005 | Ryu | H01Q 21/29 343/702 |
| 2008/0132283 A1* | 6/2008 | Ponce De Leon | H04B 1/3838 455/566 |
| 2009/0096683 A1* | 4/2009 | Rosenblatt | H01Q 1/242 343/702 |
| 2009/0143106 A1* | 6/2009 | Meitzler | H04M 1/72409 345/173 |
| 2009/0201260 A1* | 8/2009 | Lee | G06F 3/04883 345/173 |
| 2010/0041431 A1* | 2/2010 | Kim | G06F 1/1626 345/158 |
| 2011/0300909 A1* | 12/2011 | Namima | H04M 1/724 455/566 |
| 2012/0071203 A1* | 3/2012 | Wong | H04M 1/724 455/550.1 |
| 2012/0206556 A1* | 8/2012 | Yu | H04W 52/288 348/14.02 |
| 2012/0227486 A1* | 9/2012 | Liu | G06F 3/0346 73/488 |
| 2013/0113993 A1* | 5/2013 | Dagit, III | H04N 21/41265 348/734 |
| 2013/0176415 A1* | 7/2013 | Kim | H04N 21/4821 348/78 |
| 2013/0232570 A1* | 9/2013 | Ota | H04M 1/67 726/19 |
| 2014/0128032 A1* | 5/2014 | Muthukumar | H04W 52/0254 455/412.2 |
| 2014/0168117 A1* | 6/2014 | Kim | H04M 1/6505 345/173 |
| 2014/0168135 A1* | 6/2014 | Saukko | G06F 1/169 345/173 |
| 2014/0335916 A1 | 11/2014 | Thorson et al. | |
| 2014/0342781 A1* | 11/2014 | Sakurazawa | G06F 1/169 455/566 |
| 2015/0085312 A1* | 3/2015 | Tanimoto | H04N 1/00307 358/1.14 |
| 2015/0207861 A1* | 7/2015 | Tobita | H04L 67/10 709/203 |
| 2015/0237183 A1* | 8/2015 | Novet | H04M 1/72454 455/556.1 |
| 2015/0288933 A1* | 10/2015 | Iversen | G06T 7/174 348/14.07 |
| 2015/0296065 A1* | 10/2015 | Narita | H04M 1/0206 455/556.2 |
| 2016/0006860 A1* | 1/2016 | Neitzel | H04M 1/0264 455/556.1 |
| 2016/0021692 A1* | 1/2016 | Saito | H04N 7/183 370/329 |
| 2016/0036474 A1 | 2/2016 | Broyde et al. | |
| 2016/0048167 A1* | 2/2016 | Aurongzeb | G06F 1/1694 361/679.26 |
| 2016/0057260 A1* | 2/2016 | Eremenko | H04M 1/0256 455/550.1 |
| 2016/0352874 A1* | 12/2016 | Lawrenson | H04M 1/0202 |
| 2017/0117929 A1* | 4/2017 | Nghiem | H04B 1/3838 |
| 2017/0251343 A1* | 8/2017 | Robbins | H04W 4/50 |
| 2017/0272421 A1* | 9/2017 | Murakami | G05B 19/00 |
| 2017/0310805 A1* | 10/2017 | Dai | H01Q 1/242 |
| 2017/0356980 A1* | 12/2017 | Islam | G01S 5/02 |
| 2018/0067518 A1* | 3/2018 | Lawrenson | G06F 1/1662 |
| 2018/0320820 A1* | 11/2018 | Scott | H04M 1/04 |
| 2018/0348867 A1* | 12/2018 | Mujibiya | G06F 3/016 |
| 2018/0356904 A1* | 12/2018 | Disano | G06F 3/0488 |
| 2018/0358991 A1* | 12/2018 | Kwok | H01Q 1/1257 |
| 2019/0014200 A1* | 1/2019 | Cho | H04M 1/7246 |
| 2019/0020760 A1* | 1/2019 | DeBates | H04B 1/38 |
| 2019/0045046 A1* | 2/2019 | Ma | H04M 1/724 |
| 2019/0150003 A1* | 5/2019 | He | H04B 7/0617 342/368 |
| 2019/0167093 A1* | 6/2019 | Breuninger | A61B 3/103 |
| 2019/0215399 A1* | 7/2019 | Simon | G05D 1/00 |
| 2019/0228589 A1* | 7/2019 | Dascola | G06F 3/04883 |
| 2019/0253108 A1* | 8/2019 | Zhang | H04B 7/0413 |
| 2019/0268461 A1* | 8/2019 | Ai | H04M 1/72454 |
| 2019/0387091 A1* | 12/2019 | Boss | G06F 1/1694 |
| 2020/0026354 A1* | 1/2020 | Swindells | G06F 3/016 |
| 2020/0172018 A1* | 6/2020 | Watabe | B60R 11/02 |
| 2020/0204726 A1* | 6/2020 | Ebsen | H04N 5/23206 |
| 2020/0249820 A1* | 8/2020 | Choi | G06F 3/013 |
| 2020/0304185 A1* | 9/2020 | Tsai | H01Q 21/28 |
| 2020/0333886 A1* | 10/2020 | Hung | H04M 1/72454 |
| 2020/0374386 A1* | 11/2020 | Xu | G06F 1/1694 |
| 2020/0379730 A1* | 12/2020 | Graham | H04M 1/72442 |
| 2020/0382265 A1* | 12/2020 | Fukui | H04L 5/0048 |
| 2020/0412402 A1* | 12/2020 | Liu | H04B 17/26 |
| 2021/0068188 A1* | 3/2021 | Ryu | H04L 5/0048 |
| 2021/0092031 A1* | 3/2021 | Nishikawa | H04L 43/0888 |
| 2021/0096729 A1* | 4/2021 | Dalonzo | H04M 1/72436 |
| 2021/0159990 A1* | 5/2021 | Meylan | H04B 17/309 |
| 2021/0225234 A1* | 7/2021 | Agrawal | G09G 3/03 |
| 2021/0337049 A1* | 10/2021 | Noh | G06F 3/04883 |
| 2021/0397264 A1* | 12/2021 | Jain | G06F 3/017 |
| 2022/0038129 A1* | 2/2022 | Alexander | G01R 31/00 |
| 2022/0038162 A1* | 2/2022 | Ranjan | H04W 24/08 |
| 2022/0046447 A1* | 2/2022 | Pedersen | H04W 24/08 |
| 2022/0094775 A1* | 3/2022 | Suzuki | H01Q 1/243 |
| 2022/0123822 A1* | 4/2022 | Shi | H04B 7/088 |

* cited by examiner

USER EQUIPMENT, METHOD BY A USER EQUIPMENT, AND NETWORK NODE FOR GENERATING A GRIP PATTERN NOTIFICATION THROUGH A USER INTERFACE BASED ON RADIO CHARACTERISTICS

CROSS REFERENCE TO RELATED APPLICATION

This application is a 35 U.S.C. § 371 national stage application of PCT International Application No. PCT/EP2018/061106 filed on May 2, 2018, the disclosure and content of which is incorporated by reference herein in its entirety.

TECHNICAL FIELD

The present disclosure is directed to wireless communications and, more particularly, to operations by user equipments and network nodes and methods thereof based on radio characteristics measurements to improve communication performance of the user equipments.

BACKGROUND

User equipments (UEs) typically include many antennas which are spaced apart within and/or on their housings. The various types of antennas have been rapidly proliferating to enable UEs to provide world-wide communication capabilities that support backward and emerging standards for cellular, Wireless Local Area Network (WLAN), Bluetooth (BT), satellite positioning (e.g., Global Position System (GPS), GLONASS), near field communications, etc. Moreover, the number of antennas is further increasing to support Multiple Input Multiple Output (MIMO) antenna techniques through the use of a plurality of transmit (Tx) antennas and receive (Rx) antennas.

Figure 1:
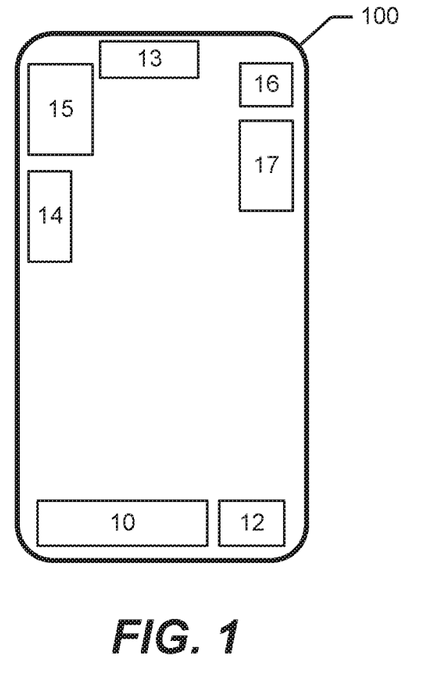
FIG. 1 is a schematic diagram illustrating locations where seven separate antennas may be provided within a UE housing.

FIG. 1 illustrates locations where seven separate antennas may be provided within the housing 100 of a Samsung Galaxy S5 brand UE. Referring to FIG. 1, the example antennas include a main antenna 10 for Tx/Rx signaling for, e.g., CDMA/EVDO BC0/BC1/BC10, 850/1900 MHz GSM/GRPS/EDGE, UMTS Band 2/5, and LTE Band 25/26. A LTE B41 main antenna 12 is included for Tx/Rx signaling. A BT and WLAN antenna 13 is included for Tx/Rx signaling for, e.g., 2.4 GHz BT/WIFI and 5 GHz WIFI. A WLAN antenna 14 is included for Tx/Rx signaling for, e.g., 2.4 GHz WIFI and 5 GHz WIFI. A MRD antenna 15 is included for Rx signaling. A GPS antenna 16 is included for Rx signaling. A LTE B41 sub antenna 17 is included for Rx signaling.

The size and shape of the antennas, the number of antennas, and the radio communication capabilities of the antennas usually varies between different types of UEs, depending upon their communication capabilities, their physical dimensions, etc.

Figure 2:
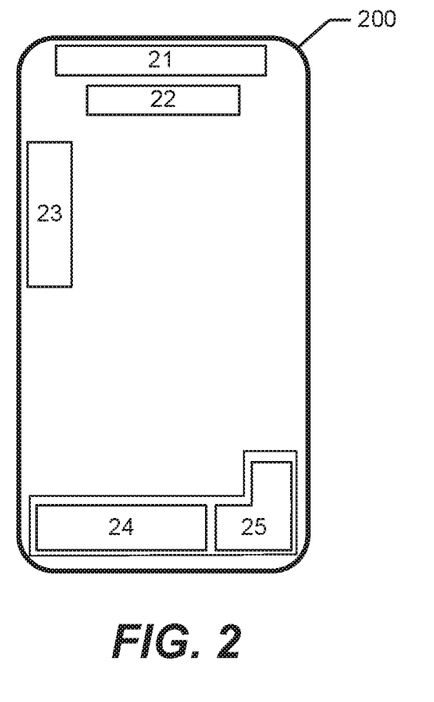
FIG. 2 is a schematic diagram illustrating locations where five separate antennas may be provided within another UE housing.

For example, FIG. 2 illustrates locations where antennas may be provided within the housing 200 of a Samsung Galaxy Note 4 brand UE. In contrast to the seven antennas shown in the example Galaxy S5 of FIG. 1, the Galaxy Note 4 shown in FIG. 2 has five antennas that include a main antenna 24 for, e.g., CDMA/EVDO BC0/BC1 Tx/Rx signaling, UMTS Band 2/5 Tx/Rx signaling, LTE B4 Rx signaling, 850/1900 MHz GSM/GPRS/EDGE Tx/Rx signaling. Another main antenna 25 is included for, e.g., LTE B13 Tx/Rx signaling and LTE B34 Tx signaling. A WLAN antenna 23 is included for 2.4/5 GHz WIFI Tx/Rx signaling. Another antenna 22 is included for, e.g., 2.4 GHz WIFI/BT Tx/Rx signaling and 5 GHz WIFI Tx/Rx signaling. Another antenna 21 is included for, e.g., CDMA/EVDO BC0/BC1 Tx/Rx signaling, LTE Band 13/4 Rx signaling, and GPS Rx signaling.

What types of antennas are present in a UE, the locations of the antennas within the UE housing, and when various ones of the antennas are presently being used for communications is unknown to a user.

SUMMARY

Some embodiments of the present disclosure are directed to a user equipment (UE) that includes a plurality of antennas, transceiver circuitry connected to the antennas to transmit and/or receive signals, a user interface configured to generate notifications to users, a processor connected to the transceiver circuit, the user interface, and a memory. The memory stores program code that is executed by the processor to perform operations that include obtaining a radio characteristics measurement for at least one of the antennas. Responsive to the radio characteristics measurement satisfying a grip pattern reconfiguration rule, a grip pattern is selected from among a set of grip patterns. A grip pattern notification is then generated through the user interface based on the grip pattern that was selected.

Potential advantages of these operations include that UE communication performance can be improved by influencing how a user grips the UE during operation using the grip pattern notifications generated based on the radio characteristics measurements. In some further embodiments, the radio characteristics measurements can include measurements of signal strength per UE antenna, channel richness values, condition number singular value ratios, etc., which can indicate which antenna(s) are being negatively impacted a user's grip. The UE may estimate how much communication performance improvement can be achieved if the user changes how the UE is gripped according to the grip pattern notification.

Some other related embodiments are directed to a network node that includes a network interface configured to be connected to a network for communication with UEs, a processor connected to the network interface, and a memory. The memory stores program code that is executed by the processor to perform operations that include receiving messages through the network interface from UEs. The messages contain information indicating effects that different grip patterns among a set have on communication performance of the UEs and further contain characteristics of the UEs corresponding to a timeframe while the effects were determined. The characteristics indicate at least one of spatial locations of the UEs and poses of the UEs relative to at least a two dimensional reference coordinate system. The operations further include generating a repository that associates the effects with the characteristics of the UEs. Subsequently, a grip pattern selection request message is received from one of the UEs. A grip pattern is selected from among the set of grip patterns using content of the grip pattern selection request message as a reference pointer within the repository, and a grip pattern notification message is communicated toward the one of the UEs. The grip pattern notification message indicates the grip pattern that was selected.

Related methods by and computer program products executable by UEs and network nodes are disclosed. It is intended that all such additional methods, user equipment, and network nodes be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Although various embodiments are disclosed herein in the context of being performed by a UE and/or a network node, they are not limited thereto and instead can be performed in any type of electronic communication device or system.

Users can choose to grip (hold) UEs in a myriad of different ways, such as when typing on the screen, reading textual documents, browsing Internet websites, watching video, etc. Where a UE is gripped by a user's figures, palm, other parts of the hand/arm/etc., the proximity of the user's contact to the various UE antennas can impact their radio characteristics for transmitting and/or receiving signals and, thereby, the communication performance of the UE. For example, how a UE is gripped relative to the actively communicating antennas can reduce their receive/transmit signal strength, and reduction of the signal strength in one antenna among MIMO antennas can result in a less rich MIMO channel (e.g., in terms of unbalanced radio channel eigenvalues and, thereby, lower the effective radio channel rank), which in turn impairs UE communication performance.

A hand that at least partially covers (i.e., closely spaced to) some or all of the UE antennas can attenuate an uplink RF signal transmitted from the UE, which may cause the UE to transmit at higher power levels and increase the battery power consumption. As a consequence, at least partially covering one or more antennas can reduce the UE's operative lifetime between charges and compromise the end-user's satisfaction with the UE operation.

Figure 8:
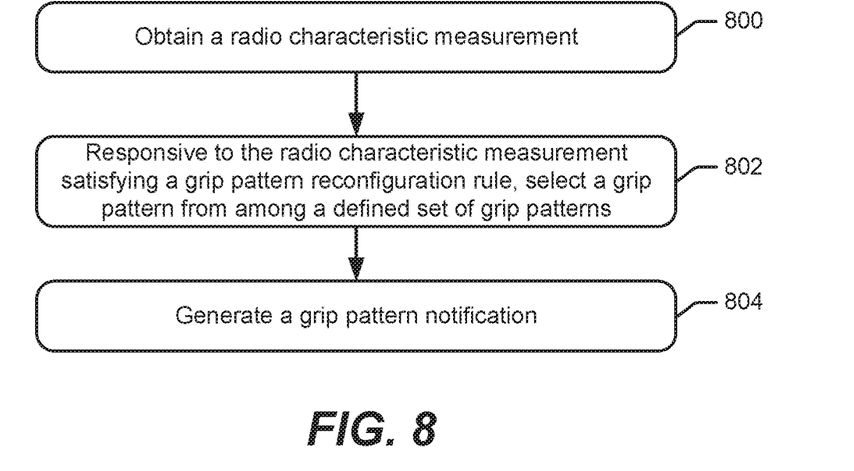
FIGS. 8 and 9 are flowcharts of operations that can be performed by a UE that is configured to operate according to some embodiments.

Various embodiments of the present disclosure are directed to improving the communication performance of UEs being held. FIG. 8 is a flowchart of operations that can be performed by a UE having a plurality of antennas to improve the communication performance of the UE while being held.

Referring to FIG. 8, the UE obtains 800 a radio characteristics measurement for at least one of the antennas. Responsive to the radio characteristics measurement satisfying a grip pattern reconfiguration rule, the UE selects 802 a grip pattern from among a set of grip patterns, and generates 804 a grip pattern notification through a user interface of the UE based on the grip pattern that was selected.

The UE may operate to generate 804 the grip pattern notification as visual feedback to a user. For example, the UE may control a display device to display a graphical representation and/or textual description of where the user's fingers and/or palm should be positioned to grip the UE to improve communication performance of the UE. Alternatively or additionally, the graphical representation and/or textual description may indicate where the user's fingers and/or palm should not be positioned to grip the UE in order to improve communication performance of the UE.

Figure 3:
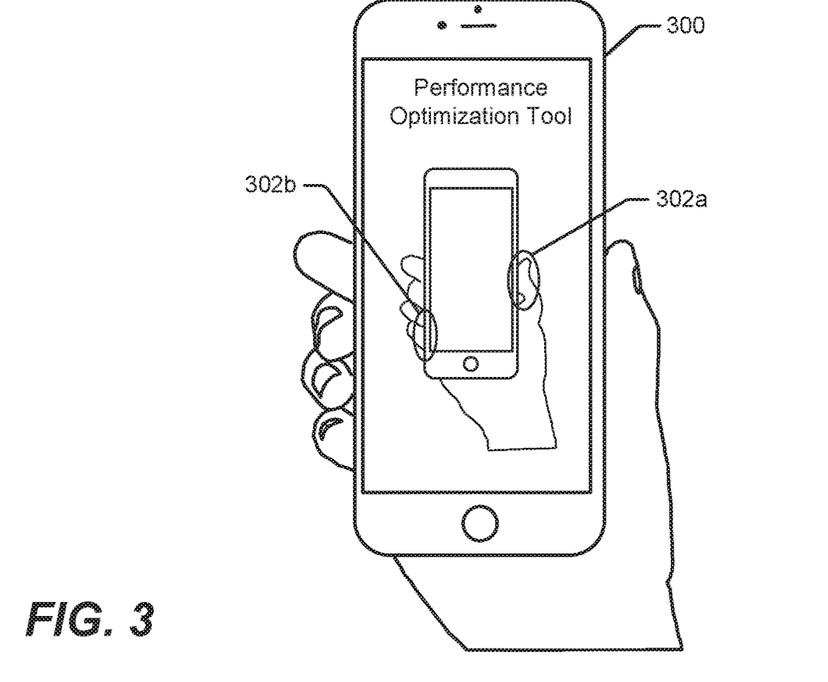
FIG. 3 illustrates a UE that performs operations to display a grip pattern notification which indicates where the UE can be gripped to improve its communication performance according to some embodiments.

FIG. 3 illustrates a UE 300 that performs operations to display a grip pattern notification which indicates where the UE can be gripped to improve its communication performance according to some embodiments. Referring to FIG. 3, the UE operates to select a graphical picture of a hand gripping a UE from among a set of graphical pictures of hands gripping UEs based on the grip pattern that was selected 802 (FIG. 8). Each of the graphical pictures in the set indicate different grip patterns of how the hands grip the UEs. The UE 300 responsively controls the display device to display the selected graphical picture.

The graphical picture that has been selected by the UE 300 for display in FIG. 3 identifies that the user can grip the UE 300 with a thumb placed according to the illustrated location 302a and fingers placed according to the illustrated location 302b, which the UE has determined should improve its communication performance. For example, the user may have been holding the UE 300 with a different grip pattern than that shown in FIG. 3, and the UE may use the obtained radio characteristics measurement to identify one or more actively communicating antennas that is negatively impacted therefrom, and select the graphical picture shown in FIG. 3 to improve the UE's communication performance.

Figure 4:
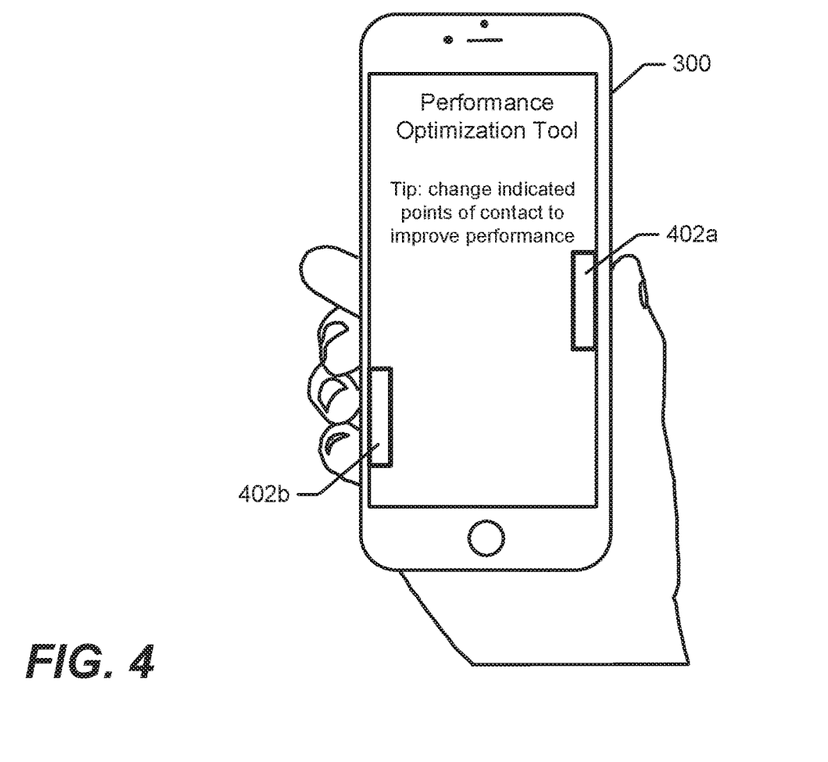
FIG. 4 illustrates a UE that performs other operations to display another grip pattern notification which indicates where the UE can be gripped to improve its communication performance according to some embodiments.

FIG. 4 illustrates alternative or additional operations which may be performed by the UE 300 to display a grip pattern notification which indicates where the UE can be gripped to improve its communication performance. Referring to FIG. 4, the UE operates to display graphical icons 402a and 402b that are spaced apart along one or more sides of the display device at locations that are determined based on the grip pattern that was selected 802 (FIG. 8), wherein the locations of the graphical icons identifies where the UE should be gripped or should not be gripped to improve communication performance of the UE.

The UE may further display textual feedback to the user, such as the textual information shown in FIG. 4, to inform the user that a performance optimization tool is being executed to provide performance enhancement tips regarding where the user should contact the UE 300 while holding it to improve communication performance.

Some other embodiments are directed to alternative operations for generating 804 (FIG. 8) the grip pattern notification through the user interface based on the grip pattern that was selected 802 (FIG. 8).

Figure 9:
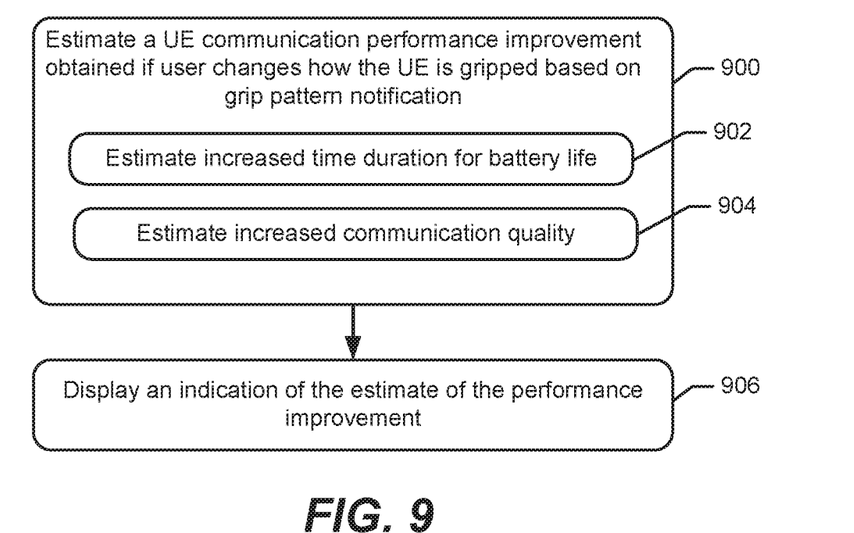

FIG. 9 is a flowchart of additional or alternative operations that can be performed by a UE to generate grip pattern notifications according to some embodiments. Referring to FIG. 9, the UE estimates 900 a UE communication performance improvement that would be obtained if the user changes how the UE is gripped based on content of the grip pattern notification (i.e., selected 802 in FIG. 8), and controls 906 the display device to display an indication of the estimate of the UE communication performance improvement.

Figure 5:
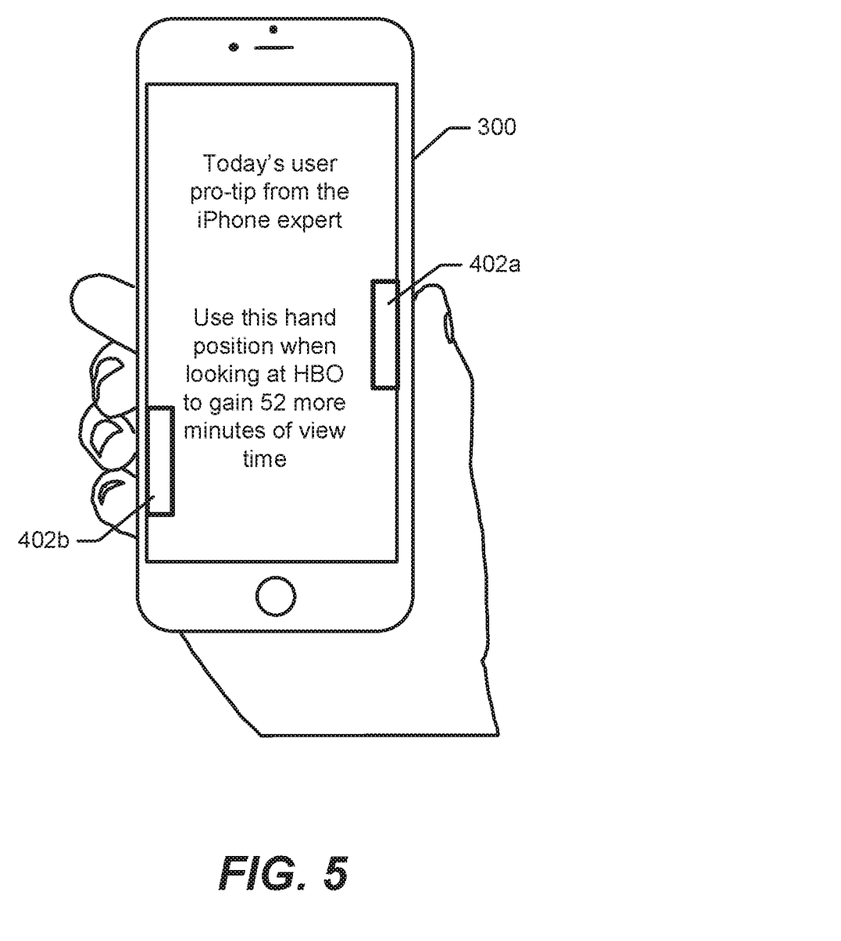
FIG. 5 illustrates a UE that performs other operations to display another grip pattern notification which indicates where the UE can be held to improve its communication performance and related operations to estimate and display what related UE communication performance improvement may be achieved according to some embodiments.

The operation to estimate 900 the UE communication performance improvement can include estimating 902 an increased time duration of battery life of the UE that would occur if the user grips the UE according to content of the grip pattern notification. FIG. 5 illustrates a UE 300 that displays the graphical icons 402a and 402b operationally described with regard to FIG. 4, and further displays an estimate of the increased time duration of battery life of the UE 300 that is predicted to occur if the user grips the UE 300 as shown in FIG. 5 on the side-housing adjacent to the displayed locations of the graphical icons 402a and 402b. In the particular example of FIG. 5, the UE 300 has operationally estimated that 52 more minutes of viewing time from the UE battery is predicted to occur if the user grips the UE 300 as shown.

With further reference to FIG. 9, the operation to estimate 900 the UE communication performance improvement can include estimating 904 an increased communication quality of the UE that is predicted to occur if the user grips the UE according to content of the grip pattern notification, and can control the display device to display an indication of the estimate of the increased communication quality. The change in communication quality that the UE estimated will occur may correspond to how much the transmit and/or receive bit rate will change, bit error rate will change, block error rate (BLER) will change, the communication bandwidth will change, the communication latency will change, and/or the quality of service (QoS) will change if the user grips UE according to content of the grip pattern notification that has been selected.

Figure 10:
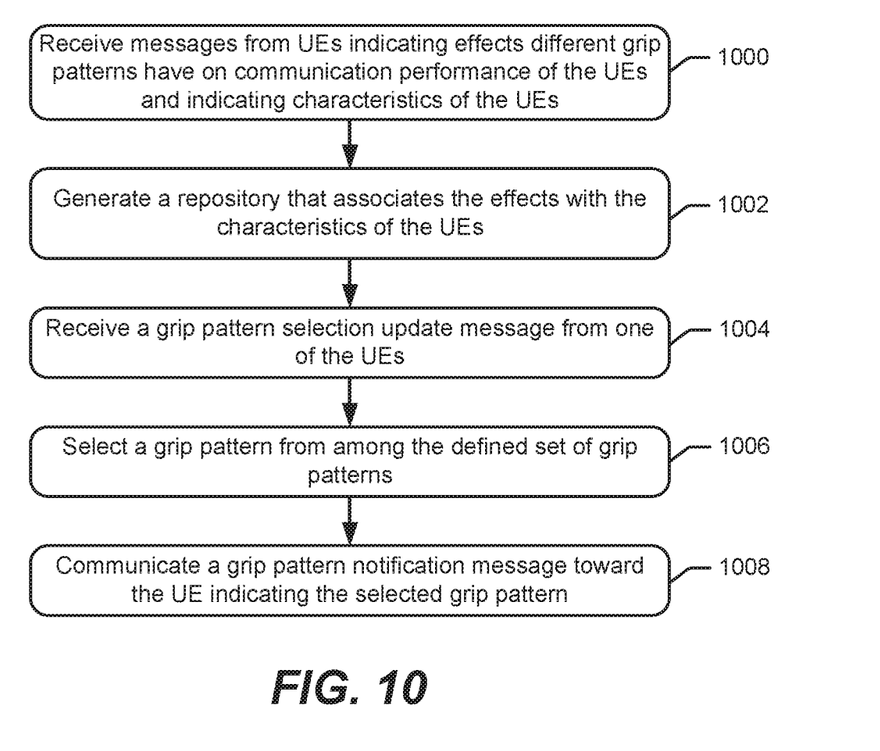
FIG. 10 is a flowchart of operations that can be performed by a network node that is configured to operate according to some embodiments.

A network node can be configured to maintain a repository that is used to select a grip pattern for use by the UE to improve communication performance of the UE. FIG. 10 is a flowchart of operations that can be performed by a network node that is configured to operate according to some embodiments.

Referring to FIG. 10, a network node receives 1000 messages through a network interface 1110 (FIG. 11) from UEs. The messages contain information indicating effects that different grip patterns among a set have on communication performance of the UEs and contain characteristics of the UEs corresponding to a timeframe while the effects were determined. The characteristics indicate at least one of spatial locations of the UEs and poses of the UEs relative to a rotational reference system. In one embodiment, the communicated UE characteristics indicate a spatial location of the UE relative to, e.g., latitude and longitudinal coordinates. In another embodiment, the communicated UE characteristics indicate whether the UE is being held in portrait pose, landscape pose, or some other indicated angular pose relative to a horizontal plane. The network node generates 1002 a repository that associates the effects with the characteristics of the UEs.

The UEs may determine their spatial locations based on, for example, satellite positioning and/or network-assisted positioning (e.g., location determination triangulation based on time arrival from base stations having known geographic locations). The UEs may determine their poses based on signals output from an orientation sensor 740 (FIG. 7) in the UEs and/or from a motion sensor 730 (FIG. 7) in the UEs.

The network node receives 1004 a grip pattern selection request message from one of the UEs, and selects 1006 a grip pattern from among the set of grip patterns using content of the grip pattern selection request message as a reference pointer within the repository. The network node then communicates 1008 a grip pattern notification message toward the one of the UEs. The grip pattern notification message indicates the grip pattern that was selected. The UE receiving the grip pattern notification message can, for example, display a graphical representation and/or a textual description of how the UE should be gripped and/or how the UE should not be gripped to improve communication performance of the UE.

Various further related operations are now described in the context of the following illustrative embodiments of the present disclosure.

Illustrative Embodiment 1

In a first illustrative embodiment, the UE operates to evaluate received signal strength balance between the UE's receive (Rx) antennas (i, j, k, ...), as for example with LTE in terms of Reference Signal Received Power (RSRP), which may be determined based on the following operations.

For all UE Rx antennas, the UE measures the corresponding RSRP and, determines when (Delta_RSRP=RSRP_antenna_i−RSRP_antenna_j)>delta_RSRP_threshold, and responsively the UE marks antenna i as having an impaired signal strength due to how the UE is being gripped by a user. These operations serve to identify which, if any, of the antennas are being sufficiently operationally impaired by the users grip on the UE. The UE responsively generates a grip pattern notification when an antenna is sufficiently operationally impaired, which can be provided as a visual indication on a display device that indicates how the user should move a finger, palm, etc. to reduce the effect on the worst impaired antenna (marked antenna i) based on the determination above. The generated notification can trigger an action by the user to change how the UE is gripped. The UE may determine when and/or how often to re-measure radio characteristics of the one or more antennas based on whether the Delta_RSRP can be improved a threshold amount. For example, when the re-measured Delta_RSRP is improved, the UE repeats the operations to determine whether the grip pattern reconfiguration rule is satisfied, and, in contrast, when the re-measured Delta_RSRP is not improved the UE can pause for a defined time duration before repeating the operations to determine whether the grip pattern reconfiguration rule is satisfied.

By way of further example, when only one antenna located on one side of the UE is sufficiently negatively impacted, the notification can be configured to cause the user to move one hand away from that antenna. In contrast, when the two antennas located on opposite sides of the UE are sufficiently negatively impacted, the notification can be configured to cause the user to move both hands away from to those antennas.

Because different antennas can be used by different applications at different times, such as one application that defaults to streaming video through the UE WiFi transceiver and antennas and another application that defaults to sending text messages through the UE cellular transceiver and antennas, the UE can dynamically monitor the radio characteristics measurements of the antenna(s) that is actively being used by one or more applications executed by the UE, and responsively generate grip pattern notifications relative to the antennas for the user. For example, when the UE is primarily being used to stream video through one or more WLAN antennas, the UE may dynamically monitor the radio characteristics of those antennas and responsively provide grip guidance relative to those antennas, i.e. grip pattern notifications, for how to improve communication performance.

In some other embodiments, the UE dynamically monitors the radio characteristics measurements of the antenna(s) that is actively being used by one or more applications executed by the UE, and reports the radio characteristics measurements to a network node. This reporting may occur with or without generating grip pattern notifications through the user interface.

In the context of the operations of FIG. 8, the operations to obtain 800 the radio characteristics measurement for the at least one of the antennas, include measuring received signal strength for at least two of the antennas. The operations to select 802 a grip pattern from among the set, responsive to the radio characteristics measurement satisfying the grip pattern reconfiguration rule, can include determining that the grip pattern reconfiguration rule is satisfied based on a difference between the received signal strength measurements for the at least two of the antennas exceeding a threshold value, determining which of the at least two of the antennas is more affected by the user's grip pattern based on the difference between the received signal strength measurements, and then selecting the grip pattern from among the set of grip patterns based on which of the at least two of the antennas is determined to be more affected.

Illustrative Embodiment 2

In a second illustrative embodiment, the UE evaluates MIMO-channel characteristics using a relevant metric, such as a richness value that is calculated as the logarithm of the ratio between geometric and arithmetic mean of channel matrix eigenvalues, such as based on the following Equation 1 below:

$$\text{channel richness value} = \log_2\left(\frac{\left(\prod_{k=1}^{K}\lambda_k\right)^{1/K}}{\frac{1}{K}\sum_{k=1}^{K}\lambda_k}\right), \quad \text{(Equation 1)}$$

where $K=\min(N_t, N_r)$, $\lambda_k$ is the channel matrix eigenvalue k, $N_t$ and $N_r$ is the number of transmitting and receiving antenna elements.

Corresponding operations performed by the UE can include measuring a channel matrix, generating channel matrix eigenvalues therefrom, and generating channel richness values according to Equation 1. Based on comparing the channel richness value to a selected threshold, the UE triggers an action to be performed by the user to change how the UEs is gripped, and can display or otherwise provide a grip pattern notification through the user interface, such as shown in one or more of FIGS. 3-5. The UE determines whether another measurement of the channel richness value has improved and, if so, can pause for a defined time duration before re-performing the operations of FIG. 8. In contrast, when the channel richness value is not improved, the UE can repeat the operations of FIG. 8.

In the context of the operations of FIG. 8, the operations to obtain 800 the radio characteristics measurement for the at least one of the antennas, include generating a channel matrix based on signal measurements from at least two of the antennas receiving MIMO communication signals, determining eigenvalues for the channel matrix, and determining a channel richness value based on the eigenvalues for the channel matrix. The operations to select 802 a grip pattern from among the set, responsive to the radio characteristics measurement satisfying the grip pattern reconfiguration rule, can include determining that the grip pattern reconfiguration rule is satisfied based on a comparison of the channel richness value to a threshold value.

Illustrative Embodiment 3

In a third illustrative embodiment, the UE evaluates MIMO-channel characteristics using a relevant metric, such as condition number (C), i.e., the ratio C of the largest to smallest singular value in the singular value decomposition of a channel matrix. The UE then identifies non-optimal hand-position that is indicated by impairment of the metric. The UE responsively triggers remedial actions that can include generating a grip pattern notification to change the user's grip pattern on the UE.

Corresponding operations performed by the UE can include measuring a channel matrix, generating channel matrix singular values, and generating a ratio C of the largest to smallest singular value in the singular value decomposition of a channel matrix. Based on the condition number C satisfying a defined threshold, the UE triggers an action to be performed by the user to change how the UEs is gripped, and can display or otherwise provide a grip pattern notification through the user interface, such as shown in one or more of FIGS. 3-5. The UE determines whether another measurement of the channel richness value has improved and, if so, can pause for a defined time duration before re-performing the operations of FIG. 8. In contrast, when the channel richness value is not improved, the UE can repeat the operations of FIG. 8.

In the context of the operations of FIG. 8, the operations to obtain 800 the radio characteristics measurement for the at least one of the antennas, include generating a channel matrix based on signal measurements from the at least two of the antennas receiving MIMO communication signals, determining singular values of the channel matrix, and determining a ratio of a largest one of the singular values to a smallest one of the singular values. The operations to select 802 a grip pattern from among the set, responsive to the radio characteristics measurement satisfying the grip pattern reconfiguration rule, can include determining that the grip pattern reconfiguration rule is satisfied based on a comparison of the ratio to a threshold value.

Illustrative Embodiment 4

In a fourth illustrative embodiment, the UE evaluates MIMO-channel characteristics using a relevant metric, such as singular values ratios which are generated based on the ratio of all singular values in the smallest singular value, provides a list showing channel richness per MIMO layer, and then identifies non-optimal hand-position that is indicated by impairment of the metric. The UE responsively triggers remedial actions that can include generating a grip pattern notification to change the user's grip pattern on the UE.

Corresponding operations performed by the UE can include measuring a channel matrix, generating channel matrix singular values, and generating singular values ratios based on the ratio of all singular values to the smallest singular value from the singular value decomposition of the channel matrix. Based on the singular values ratios satisfying a defined threshold, the UE triggers an action to be performed by the user to change how the UEs is gripped, and can display or otherwise provide a grip pattern notification through the user interface, such as shown in one or more of FIGS. 3-5. The UE determines whether another measurement of the channel richness value has improved and, if so, can pause for a defined time duration before re-performing the operations of FIG. 8. In contrast, when the channel richness value is not improved, the UE can repeat the operations of FIG. 8.

In the context of the operations of FIG. 8, the operations to obtain 800 the radio characteristics measurement for the at least one of the antennas, include generating a channel matrix based on signal measurements from the at least two of the antennas receiving MIMO communication signals, determining singular values of the channel matrix, and for each of the singular values, generating a singular value ratio based on a ratio of the singular value to a smallest one of the singular values. The operations to select 802 a grip pattern from among the set, responsive to the radio characteristics measurement satisfying the grip pattern reconfiguration rule, can include determining that the grip pattern reconfiguration rule is satisfied based on comparison of each of the singular value ratios to a threshold value.

Example MIMO Receiver Connected to a Hand Interference Compensator

Figure 6:
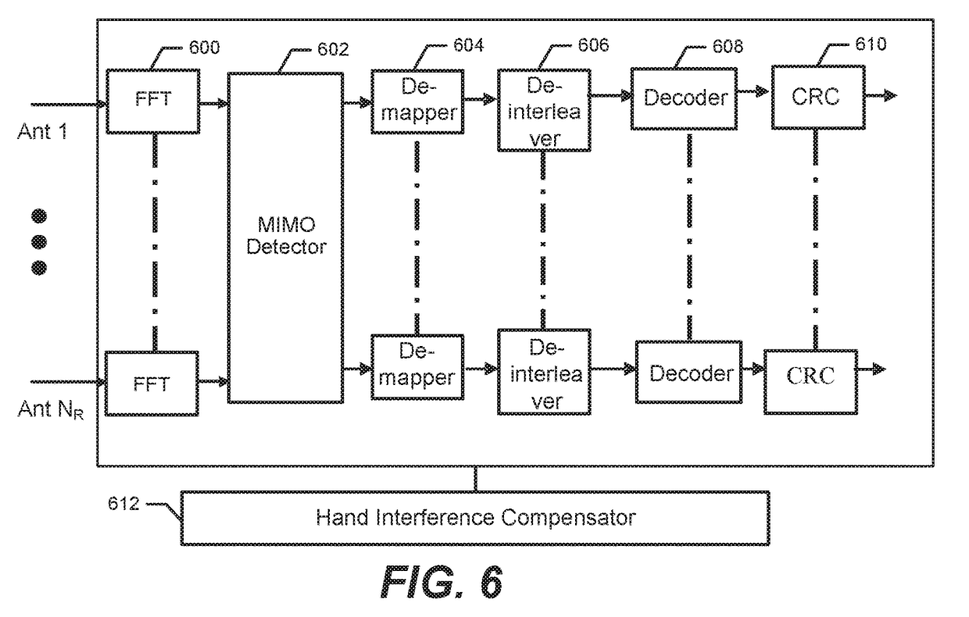
FIG. 6 is a schematic diagram of a multiple codeword MIMO receiver with a hand interference compensator configured according to some embodiments.

FIG. 6 is a schematic diagram of a MIMO receiver portion of a transceiver that processes signals from $N_R$ receiving antennas and is connected to a hand interference compensator 612. The receiver portion processes signals received by the $N_R$ antennas through respective Fast Fourier Transform (FFT) blocks 600. A MIMO detector 602 operates to remove multi antenna interference. De-mappers 604 compute bit log likelihood ratios from the MIMO detector output which is in the symbol domain. The bit stream is then de-interleaved by de-interleavers 606 and passed to a channel decoder 608 for decoding. A CRC check is performed by a CRC unit 610 on the output of the channel decoder 608. If the CRC check passes then a transport block is considered to be passed and an ACK is sent back to the transmitter via a feedback channel (also called uplink control channel, HS-DPCCH in HSDPA, and PUCCH/PUSCH in LTE/LTE-A). In contrast, if the CRC check fails then a NAK is sent back to the transmitter using the uplink control channel.

The hand interference compensator 612 operates according to one or more of the above illustrative embodiments 1-4 and/or the operational description herein related to FIGS. 3-5 and 8-9 to evaluate MIMO-channel characteristics obtained from these components and/or an interference cancellation component and a channel estimator component that process output of the CRC 610.

Illustrative Embodiment 5

In a fifth illustrative embodiment, the UE can learn over time what communication performance improvements and/or communication performance degradation resulted from providing various different grip pattern notification messages to users.

Corresponding operations that can be performed by the UE include repetitively performing over a defined time period the operations of FIG. 8 to obtain 800 a radio characteristics measurement, select 802 a grip pattern, and generate 804 a grip pattern notification. The UE determines over the time period, effects that different selected ones of the grip patterns in the set have on the radio characteristics measurements. Based on the effects that are determined, the UE adapts the operations for selecting 804 a grip pattern from among the defined set of grip patterns.

Illustrative Embodiment 6

In a sixth illustrative embodiment, when selecting a grip pattern the UE can consider the UE's physical location (e.g. its spatial location in the radio network), the UEs magnetic direction relative to North-South-East-West, and the UEs orientation relative to one or more defined axes.

Corresponding operations that can be performed by the UE to select 804 a grip pattern from among the set of grip patterns, can include determining at least one of a spatial location of the UE and a pose of the UE relative to a rotational reference system, and selecting the grip pattern from among the set of grip patterns based on a result of the determination.

Illustrative Embodiment 7

In a seventh illustrative embodiment, the UE can use statistics relating to the radio characteristics measurements, what corresponding applications are being executed by the UE and/or content that is being communicated through the antennas, and the users' grip pattern on the UE, to determine how much additional battery life is being lost by various user grip patterns on the UE and/or how much additional battery life can be gained by various user grip patterns on the UE when executing those corresponding applications and/or communicating that content through the antennas.

Corresponding operations that can be performed by the UE can include repetitively performing over a defined time period the operations of FIG. 8 to obtain 800 a radio characteristics measurement, select 802 a grip pattern, and generate 804 a grip pattern notification. The UE determines over the time period, effects that different ones of the grip patterns in the set, which were selected based on the radio characteristics measurements satisfying the grip pattern reconfiguration rule, have on at least one of battery power consumption and a communication quality (e.g., bit rate, bit error rate, block error rate, etc.) of the UE. Based on the effects that are determined, the UE forecasts what effect the grip pattern that is selected from the set will have on communication performance of the UE. The UE then controls the display device to display an indication the forecast of the fact of the grip pattern the selected.

Illustrative Embodiment 8

In an eighth illustrative embodiment, the UE can learn over time which grip patterns have what effects on the UE communication performance when executing defined applications in a set. The UE can then identify when a particular application is being executed, which can be used to influence which grip pattern among a set is selected as being preferable for use by a user while that application is executing.

Corresponding operations that can be performed by the UE can include repetitively performing over a defined time period the operations of FIG. 8 to obtain 800 a radio characteristics measurement, select 802 a grip pattern, and generate 804 a grip pattern notification. The UE determines over the time period, effects that different ones of the grip patterns in the set, which were selected based on the radio characteristics measurements satisfying the grip pattern reconfiguration rule, have on communication performance of the UE when executing applications in the set. The UE identifies one of the applications among the set that is presently being executed by the UE. The UE selects the grip pattern from among the set of grip patterns based on the determined effect of the grip pattern on the UE communication performance of the one of the applications.

Illustrative Embodiment 9

In a ninth illustrative embodiment, the UE may control when operations to select a grip pattern are performed based on whether the UE is being moved. In one embodiment, the UE determines when it has become substantially stationary for at least a threshold time (e.g., using signals from the motion sensor 730 in FIG. 7). Responsive to determining that the UE has become substantially stationary for at least the threshold time, the UE initiates a determination of whether the radio characteristics measurement satisfies the grip pattern reconfiguration rule, and responsive to the grip pattern reconfiguration rule being satisfied performs the selection of the grip pattern and the generating of the grip pattern notification.

Illustrative Embodiment 10

In a tenth illustrative embodiment, the UE generates statistics, based on operations disclosed herein, that are reported to a network node. The network node may be operated by a network operator, UE manufacturer, application developer, etc. Corresponding operations that can be performed by the UE can include repetitively performing over a defined time period the operations of FIG. 8 to obtain 800 a radio characteristics measurement, select 802 a grip pattern, and generate 804 a grip pattern notification. The UE determines over the time period, effects that different ones of the grip patterns in the set, which were selected based on the radio characteristics measurements satisfying the grip pattern reconfiguration rule, have on communication performance of the UE while recording associated characteristics of the UE that include at least one of spatial locations of the UE and poses of the UE relative to a rotational reference system. The UE communicates at least one message to a network node through the transceiver circuitry that contains information indicating the determined effects and the recorded associated characteristics of the UE.

Example UE and Network Node

Figure 7:
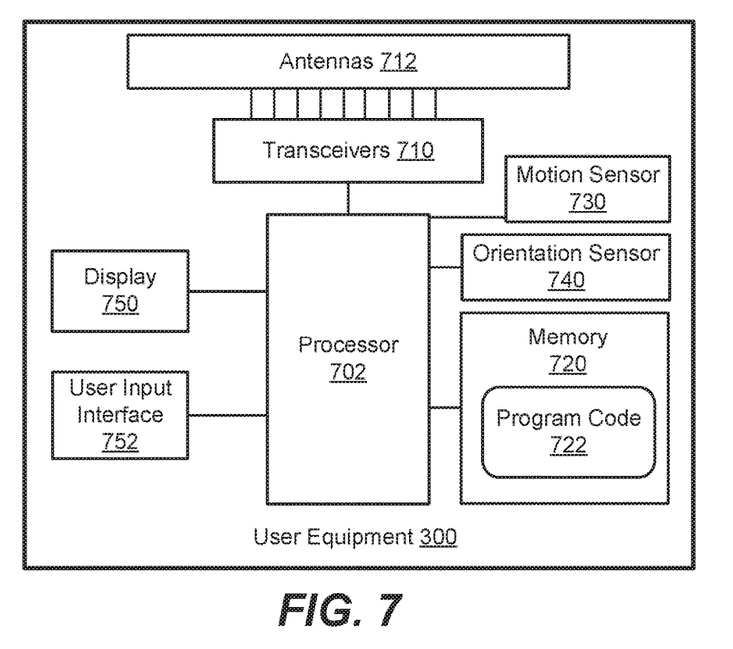
FIG. 7 is a block diagram of a UE that is configured to operate according to some embodiments.

FIG. 7 is a block diagram of a UE 300 that is configured to perform operations according to one or more embodiments disclosed herein. The UE 300 includes a plurality of antennas 712 (e.g., antennas shown in FIG. 1 or 2), at least one transceiver 710 ("transceiver" for brevity), at least one processor 702 ("processor" for brevity), and at least one memory 720 ("memory" for brevity) containing program code 722. The UE 300 may further include a display 750, a user interface 752 (e.g., touch input interface, keyboard, microphone, speaker, video output circuit, audio output circuit, etc). The UE 300 may include a motion sensor 730 (e.g., multi-axis accelerometer) that is configured to output a signal indicating presence of motion and level of motion of the UE 300, and may include an orientation sensor 740 that is configured to output a signal indicating an orientation of the UE 300 relative to one, two, three, or more defined axes.

The transceiver 710 is configured to communicate with a network node through a wireless air interface using one or more of the radio access technologies disclosed herein. The processor 702 may include one or more data processing circuits, such as a general purpose and/or special purpose processor, e.g., microprocessor and/or digital signal processor. The processor 702 is configured to execute computer program code 722 stored in the memory 720 to perform at least some of the operations described herein as being performed by a UE.

Figure 11:
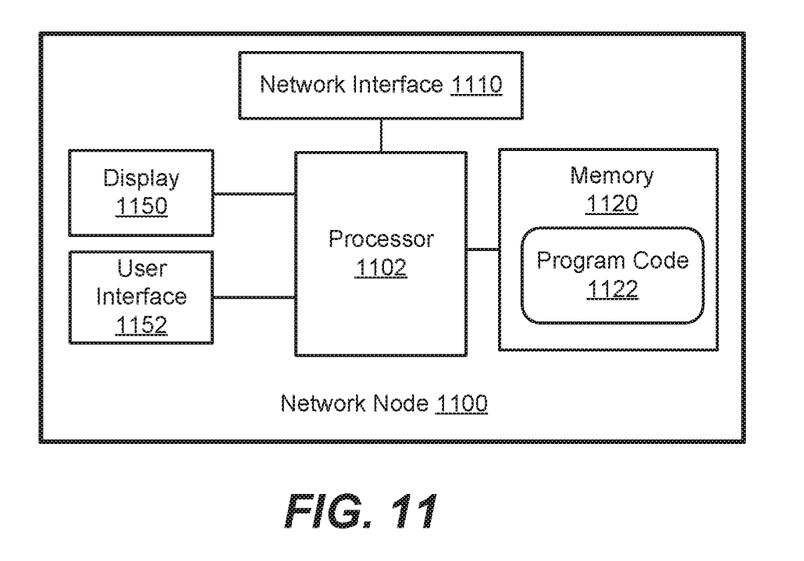
FIG. 11 is a block diagram of a network node that is configured to operate according to some embodiments.

FIG. 11 is a block diagram of a network node 1100 that is configured according to one or more embodiments disclosed herein for a network node that is configured to communicate with a UE via a radio access network (e.g., WLAN, base station, eNB, NR, etc). The network node may, for example, be operated by a network operator, UE manufacturer, application developer, etc. The network node 1100 can include at least one network interface ("network interface" for brevity), at least one processor 1102 ("processor" for brevity), and at least one memory 1120 ("memory" for brevity) storing program code 1122. The network node 1100 may further include a display 1150, a user interface 1152 (e.g., touch input interface, keyboard, microphone, speaker, video output circuit, audio output circuit, etc.).

The processor 1102 may include one or more data processing circuits, such as a general purpose and/or special purpose processor, e.g., microprocessor and/or digital signal processor, that may be collocated or distributed across one or more networks. The processor 1102 is configured to execute computer program code 1122 stored in the memory 1120 to perform at least some of the operations and methods of described herein as being performed by a network node.

In some embodiments the non-limiting term radio network node or simply network node is used and it refers to any type of network node serving a UE and/or connected to another network node or network element or any radio node from which a UE receives a signal. Examples of radio network nodes include, but are not limited to, Node B, base station (BS), multi-standard radio (MSR) radio node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used and it refers to any type of wireless device communicating with a radio network node in a cellular or mobile communication system. Examples of a UE are any target device, device to device (D2D) UE, machine type UE or UE capable of machine to machine (M2M) communication, PDA, iPAD, Tablet, mobile terminals, smart phone, laptop embedded equipment (LEE), laptop mounted equipment (LME), USB dongles etc.

Various embodiments are described in the context of MIMO operation. The embodiments are however applicable to any RAT or multi-RAT system where the UE operates using MIMO, e.g. 5G, "5g NR", LTE FDD/TDD, GSM/GERAN, WiFi, WLAN, WiMax, CDMA2000 etc.

Operations that are described herein as being performed by a UE or network node may additionally or alternatively be performed through virtualization in the hardware and/or software of a standalone server, a cloud-implemented server, a distributed server or as processing resources in a server farm.

ABBREVIATIONS

3GPP 3rd Generation Partnership Project'
BLER Block error rate
eNB Evolved Node B
LoS Line of Sight
LTE Long Term Evolution
MIMO Multiple-Input Multiple-Output
PL Path Loss
RF Radio Frequency
RSRP Reference Signal Received Power
RRM Radio Resource Management
Rx Receive (antenna)
Tx Transmit (antenna)
UE User Equipment Further Definitions and Embodiments In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A user equipment, UE, comprising:
   antennas;
   transceiver circuitry connected to the antennas to transmit and/or receive signals;
   a user interface configured to generate notifications to users;
   a display device;
   a processor connected to the transceiver circuitry and the user interface;
   a memory-storing program code that is executed by the processor to perform operations comprising:
      obtaining a radio characteristics measurement for at least one of the antennas;
      responsive to the radio characteristics measurement satisfying a grip pattern reconfiguration rule, selecting a grip pattern from among a set of grip patterns; and
      generating a grip pattern notification through the user interface based on the grip pattern that was selected,
   wherein generating the grip pattern notification through the user interface based on the grip pattern that was selected, comprises:
      controlling the display device to display a graphical representation and/or textual description of where the user's fingers and/or palm should be positioned to grip the UE to improve communication performance of the UE, and
   wherein controlling the display device to display the graphical representation and/or textual description, comprises:
      displaying graphical icons that are spaced apart along one or more sides of the display device at locations that are determined based on the grip pattern that was selected, wherein the locations of the graphical icons identify where the UE should be gripped or should not be gripped to improve communication performance of the UE.

2. The UE of claim 1, wherein controlling the display device to display the graphical representation and/or textual description of where the user's fingers and/or palm should be positioned to grip the UE to improve communication performance of the UE, comprises:
   selecting a graphical picture of a hand gripping a UE from among a set of graphical pictures of hands gripping UEs based on the grip pattern that was selected, wherein each of the graphical pictures in the set indicate different grip patterns of how the hands grip the UEs; and
   controlling the display device to display the selected graphical picture.

3. The UE of claim 1, wherein:
   obtaining the radio characteristics measurement for the at least one of the antennas, comprises:
      generating a channel matrix based on signal measurements from at least two of the antennas receiving Multiple Input Multiple Output, MIMO, communication signals;
      determining eigenvalues for the channel matrix; and
      determining a channel richness value based on the eigenvalues for the channel matrix; and
   responsive to the radio characteristics measurement satisfying a grip pattern reconfiguration rule, selecting the grip pattern from among the set of grip patterns, comprises:
      determining that the grip pattern reconfiguration rule is satisfied based on a comparison of the channel richness value to a threshold value.

4. The UE of claim 1, wherein:
   obtaining the radio characteristics measurement for the at least one of the antennas, comprises:
      generating a channel matrix based on signal measurements from the at least two of the antennas receiving Multiple Input Multiple Output, MIMO, communication signals;
      determining singular values of the channel matrix; and
      determining a ratio of a largest one of the singular values to a smallest one of the singular values; and
   responsive to the radio characteristics measurement satisfying a grip pattern reconfiguration rule, selecting the grip pattern from among the set of grip patterns, comprises:
      determining that the grip pattern reconfiguration rule is satisfied based on a comparison of the ratio to a threshold value.

5. The UE of claim 1, wherein:
   obtaining the radio characteristics measurement for the at least one of the antennas, comprises:
      generating a channel matrix based on signal measurements from the at least two of the antennas receiving Multiple Input Multiple Output, MIMO, communication signals;
      determining singular values of the channel matrix; and
      for each of the singular values, generating a singular value ratio based on a ratio of the singular value to a smallest one of the singular values; and responsive to the radio characteristics measurement satisfying a grip pattern reconfiguration rule, selecting the grip pattern from among the set of grip patterns, comprises:
  determining that the grip pattern reconfiguration rule is satisfied based on comparison of each of the singular value ratios to a threshold value.

6. The UE of claim 1, further comprising:
repeating the obtaining, the selecting, and the generating over a time period;
determining over the time period, effects that different selected ones of the grip patterns in the set have on the radio characteristics measurements; and
based on the effects that are determined, adapting operations for selecting a grip pattern from among the defined set of grip patterns.

7. The UE of claim 1, wherein responsive to the radio characteristics measurement satisfying a grip pattern reconfiguration rule, selecting the grip pattern from among the set of grip patterns, comprises:
  determining at least one of a spatial location of the UE and a pose of the UE relative to a rotational reference system; and
  selecting the grip pattern from among the set of grip patterns based on a result of the determination.

8. The UE of claim 1, further comprising:
repeating the obtaining, the selecting, and the generating over a time period;
determining over the time period, effects that different ones of the grip patterns in the set, which were selected based on the radio characteristics measurements satisfying the grip pattern reconfiguration rule, have on at least one of battery power consumption and a communication quality of the UE; and
based on the effects that are determined, forecasting what effect the grip pattern that is selected from the set will have on communication performance of the UE; and
controlling the display device to display an indication of the forecasted effect of the grip pattern that is selected.

9. The UE of claim 1, further comprising:
determining when the UE has become substantially stationary for at least a threshold time; and
responsive to determining that the UE has become substantially stationary for at least the threshold time, initiating a determination of whether the radio characteristics measurement satisfies the grip pattern reconfiguration rule, and responsive to the grip pattern reconfiguration rule being satisfied performing the selection of the grip pattern and the generating of the grip pattern notification.

10. The UE of claim 1, further comprising:
repeating the obtaining, the selecting, and the generating over a time period;
determining over the time period, effects that different ones of the grip patterns in the set, which were selected based on the radio characteristics measurements satisfying the grip pattern reconfiguration rule, have on communication performance of the UE while recording associated characteristics of the UE that include at least one of spatial locations of the UE and poses of the UE relative to a rotational reference system; and
communicating at least one message to a network node through the transceiver circuitry that contains information indicating the determined effects and the recorded associated characteristics of the UE.

11. A user equipment, UE, comprising:
antennas;
transceiver circuitry connected to the antennas to transmit and/or receive signals;
a user interface configured to generate notifications to users;
a display device;
a processor connected to the transceiver circuitry and the user interface;
a memory-storing program code that is executed by the processor to perform operations comprising:
  obtaining a radio characteristics measurement for at least one of the antennas;
  responsive to the radio characteristics measurement satisfying a grip pattern reconfiguration rule, selecting a grip pattern from among a set of grip patterns; and
  generating a grip pattern notification through the user interface based on the grip pattern that was selected,
wherein generating the grip pattern notification through the user interface based on the grip pattern that was selected, comprises:
  estimating a UE communication performance improvement that would be obtained if the user changes how the UE is gripped based on content of the grip pattern notification; and
  controlling the display device to display an indication of the estimate of the UE communication performance improvement, and
wherein estimating the UE communication performance improvement that would be obtained if the user changes how the UE is gripped based on content of the grip pattern notification, comprises:
  estimating an increased time duration of battery life of the UE that is predicted to occur if the user grips the UE according to content of the grip pattern notification; and
  controlling the display device to display an indication of the estimate of the increased time duration.

12. The UE of claim 11, wherein estimating the UE communication performance improvement that would be obtained if the user changes how the UE is gripped based on content of the grip pattern notification, comprises:
  estimating an increased communication quality of the UE that is predicted to occur if the user grips the UE according to content of the grip pattern notification; and
  controlling the display device to display an indication of the estimate of the increased communication quality.

13. A user equipment, UE, comprising:
antennas;
transceiver circuitry connected to the antennas to transmit and/or receive signals;
a user interface configured to generate notifications to users;
a display device;
a processor connected to the transceiver circuitry and the user interface;
a memory-storing program code that is executed by the processor to perform operations comprising:
  obtaining a radio characteristics measurement for at least one of the antennas;
  responsive to the radio characteristics measurement satisfying a grip pattern reconfiguration rule, selecting a grip pattern from among a set of grip patterns; and
  generating a grip pattern notification through the user interface based on the grip pattern that was selected,
wherein:

obtaining the radio characteristics measurement for the at least one of the antennas, comprises
measuring received signal strength for at least two of the antennas; and
responsive to the radio characteristics measurement satisfying a grip pattern reconfiguration rule, selecting the grip pattern from among the set of grip patterns, comprises:
determining that the grip pattern reconfiguration rule is satisfied based on a difference between the received signal strength measurements for the at least two of the antennas exceeding a threshold value;
determining which of the at least two of the antennas is more affected by the user's grip pattern based on the difference between the received signal strength measurements; and
selecting the grip pattern from among the set of grip patterns based on which of the at least two of the antennas is determined to be more affected.

14. A user equipment, UE, comprising:
antennas;
transceiver circuitry connected to the antennas to transmit and/or receive signals;
a user interface configured to generate notifications to users;
a display device;
a processor connected to the transceiver circuitry and the user interface;
a memory-storing program code that is executed by the processor to perform operations comprising:
obtaining a radio characteristics measurement for at least one of the antennas;
responsive to the radio characteristics measurement satisfying a grip pattern reconfiguration rule, selecting a grip pattern from among a set of grip patterns;
generating a grip pattern notification through the user interface based on the grip pattern that was selected;
repeating the obtaining, the selecting, and the generating over a time period for a set of applications being executed by the UE;
determining over the time period, effects that different ones of the grip patterns in the set, which were selected based on the radio characteristics measurements satisfying the grip pattern reconfiguration rule, have on communication performance of the UE when executing the applications in the set;
identifying one of the applications among the set that is being executed by the UE; and
selecting the grip pattern from among the set of grip patterns based on the determined effect of the grip pattern on the UE communication performance of the one of the applications.

* * * * *